(12) United States Patent
Wang et al.

(10) Patent No.: US 12,325,600 B2
(45) Date of Patent: Jun. 10, 2025

(54) STACKING AND PALLETIZING DEVICE

(71) Applicant: Baiqida Intelligent Technology (Ningbo) Co., Ltd., Zhejiang (CN)

(72) Inventors: Xingjie Wang, Zhejiang (CN); Wenzhong Zhou, Zhejiang (CN); Kaixuan Yu, Zhejiang (CN); Huihe Fang, Zhejiang (CN); Niansheng Zhou, Zhejiang (CN); Daoyang Liao, Zhejiang (CN); Hanquan Wang, Zhejiang (CN); Jian Cao, Zhejiang (CN); Jianfeng Xin, Zhejiang (CN); Hao Zhu, Zhejiang (CN); Keqi Zheng, Zhejiang (CN); Xiongpeng Zhu, Zhejiang (CN); Lei Zhang, Zhejiang (CN); Jianli Zhu, Zhejiang (CN)

(73) Assignee: Baiqida Intelligent Technology (Ningbo) Co., Ltd., Ningbo (CN)

( * ) Notice: Subject to any disclaimer, the term of this patent is extended or adjusted under 35 U.S.C. 154(b) by 0 days.

(21) Appl. No.: 18/536,231

(22) Filed: Dec. 12, 2023

(65) Prior Publication Data
US 2025/0091821 A1 Mar. 20, 2025

(30) Foreign Application Priority Data
Sep. 20, 2023 (CN) .......................... 202311212279.5

(51) Int. Cl.
*B65G 57/24* (2006.01)
*B65G 61/00* (2006.01)

(52) U.S. Cl.
CPC .............. *B65G 61/00* (2013.01); *B65G 57/24* (2013.01)

(58) Field of Classification Search
CPC ...... B65G 57/081; B65G 61/00; B65G 57/24; B65G 47/91; B65G 60/00;
(Continued)

(56) References Cited

U.S. PATENT DOCUMENTS

| 5,884,451 A * | 3/1999 | Kano ...................... B65B 61/26 53/411 |
| 7,380,387 B2 * | 6/2008 | Ishii ........................ B65B 57/12 53/136.3 |
| 2008/0185310 A1 * | 8/2008 | Trajkovich .............. B32B 27/36 206/307 |

FOREIGN PATENT DOCUMENTS

| CN | 106516229 A * | 3/2017 |
| CN | 216882338 U * | 7/2022 |

(Continued)

*Primary Examiner* — Gregory W Adams
(74) *Attorney, Agent, or Firm* — Jose Cherson Weissbrot

(57) ABSTRACT

A stacking and palletizing device includes a cassette conveying mechanism, a product transporting and flipping mechanism, a product disc stacking mechanism, and a pallet feeding mechanism. The cassette conveying mechanism is provided thereon with an blank disc receiving station, a product loading station and a product disc stacking station; the product loading station is correspondingly provided with a cassette positioning mechanism; a cassette lifting and partitioning mechanism is disposed below the product disc stacking station; the product disc stacking mechanism includes a screw rod lifting mechanism, which is provided thereon with a palletizing and conveying mechanism; and a gantry truss transplanting mechanism is correspondingly disposed above the screw rod lifting mechanism.

8 Claims, 3 Drawing Sheets

(58) Field of Classification Search
CPC ... B65G 2201/0258; B65B 35/50; B65B 5/06;
B65B 25/141; B65B 43/40; B65B 57/04;
B65B 61/28
USPC .......................................... 414/791.3; 53/243
See application file for complete search history.

(56) References Cited

FOREIGN PATENT DOCUMENTS

| CN | 116788598 A | * | 9/2023 |
| WO | WO-2022061854 A1 | * | 3/2020 |
| WO | WO-2020251287 A1 | * | 12/2020 |

* cited by examiner

STACKING AND PALLETIZING DEVICE

BACKGROUND OF THE INVENTION

1. Technical Field

The present invention relates to the technical field of neodymium iron boron (NdFeB) machining equipment, and in particular to a stacking and palletizing device.

2. Description of Related Art

NdFeB is a magnetic material known as "magneto" due to its excellent magnetic properties. NdFeB can be classified into sintered NdFeB and bonded NdFeB. Due to its magnetism far superior to that of the bonded NdFeB, the sintered NdFeB has been widely applied in fields such as electronics, electrical machinery, medical devices, tools, packaging, hardware machinery, and aerospace. NdFeB is first compressed and molded in a magnetic field, then sintered at high temperature in a vacuum sintering furnace, and subsequently cooled to allow densification. In this way, the sintered product may achieve higher magnetic properties. Therefore, a rack must be disposed in a closed condition throughout the process, and oil stripping and disc stacking operations need to be conducted in the presence of nitrogen so as to prevent oxidation of NdFeB products.

However, in the prior art, a disc transition delivery mechanism is used, where a dual-disc transferring mechanism conveys two blank discs; the first blank disc is pushed to a position corresponding to an all-electric press for material loading, and returns to an original position after the material loading is completed; and the other blank disc is pushed to a position corresponding to the all-electric press for material loading, and returns to the original position after the material loading is completed. Even with improved working efficiency, this type of structure affects the quality and working efficiency in disc stacking, because the two blank discs used have to alternately move for loading and then return to their original positions, and thus, the products are successively loaded to the two blank disc; in addition, after the products are loaded into empty graphite cassettes, it is necessary to place the graphite cassettes on the pallets together for palletizing operation; and in the existing palletizing method, the loaded products are stacked on the pallets layer by layer by a robotic arm, and for a palletizing mechanism of this type, it is necessary to deliver the graphite cassettes with products loaded and the pallets to the palletizing mechanism respectively, and to finally perform the palletizing operation by the robotic arm on the palletizing mechanism, and the three mechanisms are not closely coordinated in linkage, leading to inconsecutive operation among various mechanisms.

BRIEF SUMMARY OF THE INVENTION

An object of the present invention is to provide a stacking and palletizing device, in which a cassette conveying mechanism, a product transporting and flipping mechanism, and a pallet feeding mechanism are closely and consecutively coordinated in linkage with a product disc stacking mechanism achieve make the overall palletizing operation simple and smooth, which improves the quality and efficiency of product palletizing.

The above technical object of the present invention is achieved by the following technical solution: a stacking and palletizing device, including a cassette conveying mechanism, wherein a middle portion of the cassette conveying mechanism is provided with a product transporting and flipping mechanism at a side, a rear end of the cassette conveying mechanism is provided with a product disc stacking mechanism capable of performing disc stacking on finished products, and a pallet feeding mechanism is disposed below the cassette conveying mechanism, wherein the cassette conveying mechanism is provided thereon with an blank disc receiving station, a product loading station and a product disc stacking station; the product transporting and flipping mechanism is disposed outside of the product loading station, which is correspondingly provided with a cassette positioning mechanism; a cassette lifting and partitioning mechanism is disposed below the product disc stacking station; the product disc stacking mechanism includes a screw rod lifting mechanism, which is provided thereon with a palletizing and conveying mechanism; a gantry truss transplanting mechanism is correspondingly disposed above the screw rod lifting mechanism; during loading and disc stacking, blank discs are pushed to the blank disc receiving station, conveyed to the product loading station by the cassette conveying mechanism and positioned by the cassette positioning mechanism, products are conveyed and flipped by the product transporting and flipping mechanism and then installed in the blank discs, meanwhile, the pallet feeding mechanism conveys pallets onto the product disc stacking mechanism, then, the cassette conveying mechanism conveys loaded graphite cassettes to the disc stacking station, the products loaded into the graphite cassettes are lowered to an appropriate position by means of the cassette lifting and partitioning mechanism, the screw rod lifting mechanism drives the palletizing and conveying mechanism to move the pallets fed by the pallet feeding mechanism onto the palletizing and conveying mechanism, and finally, the gantry truss transplanting mechanism piles up the products on the cassette lifting and partitioning mechanism into the pallets for lifting and palletizing operations.

Preferably, the cassette conveying mechanism includes a conveying rack, an upper end of which is provided with two sets of movement guide rail; each set of the movement guide rail is provided with a matching graphite cassette fixing seat and a fore-and-aft movement cylinder for pushing the graphite cassette fixing seat to move; and a rear end of each graphite cassette fixing seat is provided with a graphite cassette pushing cylinder.

Further preferably, the product transporting and flipping mechanism includes a product transporting frame that is provided with a product transporting cylinder; an output end of the product transporting cylinder is connected to a product transporting tray; the product transporting frame is connected to a flipping cylinder by means of a drag chain; an output end of the flipping cylinder is connected to a flipping plate; a multi-joint robotic arm is disposed above the product loading station; and an output end of the multi-joint robotic arm is connected to a robotic arm quick-change chuck for grabbing and flipping the products on the product transporting and flipping mechanism and then grabbing and installing the products in the graphite cassettes.

Further preferably, the cassette lifting and partitioning mechanism includes a lifting and feeding port provided at a rear end of the conveying rack; a cassette lifting guide rail and a cassette lifting cylinder are disposed below the lifting and feeding port and are connected to a side surface of the conveying rack; and the cassette lifting guide rail is provided with a cassette lifting and partitioning seat connected to the cassette lifting cylinder.

Further preferably, the screw rod lifting mechanism includes a base, a middle portion of which is provided with a lifting motor; an output end of the lifting motor is connected to a master transmission seat, both ends of which are each connected to a slave transmission seat; both ends of the slave transmission seat are each connected to a horizontal transmission rod, an output end of which is meshed and connected with a vertical screw rod; and the palletizing and conveying mechanism is connected to middle portions of the vertical screw rods.

Further preferably, the palletizing and conveying mechanism includes a conveying line framework connected to the vertical screw rods, and the conveying line framework is provided with a conveying line therein.

Further preferably, the gantry truss transplanting mechanism includes horizontal linear modules of a graphite cassette grabbing mechanism disposed above the vertical screw rods; lower ends of the horizontal linear modules of the graphite cassette grabbing mechanism are provided with a matching longitudinal linear module of the graphite cassette grabbing mechanism; a lower end of the longitudinal linear module of the graphite cassette grabbing mechanism is connected, by means of a graphite cassette grabbing and lifting cylinder, to a dual-purpose clamping mechanism for cassette picking and capping; a rear end of the conveying line framework is connected with an unloading door, an inner side of which is correspondingly provided with an unloading door opening/closing and compressing mechanism.

Further preferably, the other end of the drain chain is connected to a waste collector, an upper portion of which is provided with a openable collection port.

In summary, the present invention has the following beneficial effects. During loading and disc stacking, blank discs are pushed to the blank disc receiving station, conveyed to the product loading station by the cassette conveying mechanism and positioned by the cassette positioning mechanism; products are conveyed and flipped by the product transporting and flipping mechanism and then installed in the blank discs; meanwhile, the pallet feeding mechanism conveys pallets onto the product disc stacking mechanism; then, the cassette conveying mechanism conveys loaded graphite cassettes to the disc stacking station; the products loaded into the graphite cassettes are lowered to an appropriate position by means of the cassette lifting and partitioning mechanism; the screw rod lifting mechanism drives the palletizing and conveying mechanism to move the pallets fed by the pallet feeding mechanism onto the palletizing and conveying mechanism; and the gantry truss transplanting mechanism piles up the products on the cassette lifting and partitioning mechanism into the pallets for lifting and palletizing operations. The cassette conveying mechanism, the product transporting and flipping mechanism, and the pallet feeding mechanism are closely and consecutively coordinated in linkage with the product disc stacking mechanism; and the screw rod lifting mechanism, the palletizing and conveying mechanism, the gantry truss transplanting mechanism, and the cassette lifting and partitioning mechanism are coordinated by automatic lifting to pile up the graphite cassettes with products loaded, layer by layer, such that the overall palletizing operation is simple and smooth, which improves the quality and efficiency of product palletizing.

Figure 1:
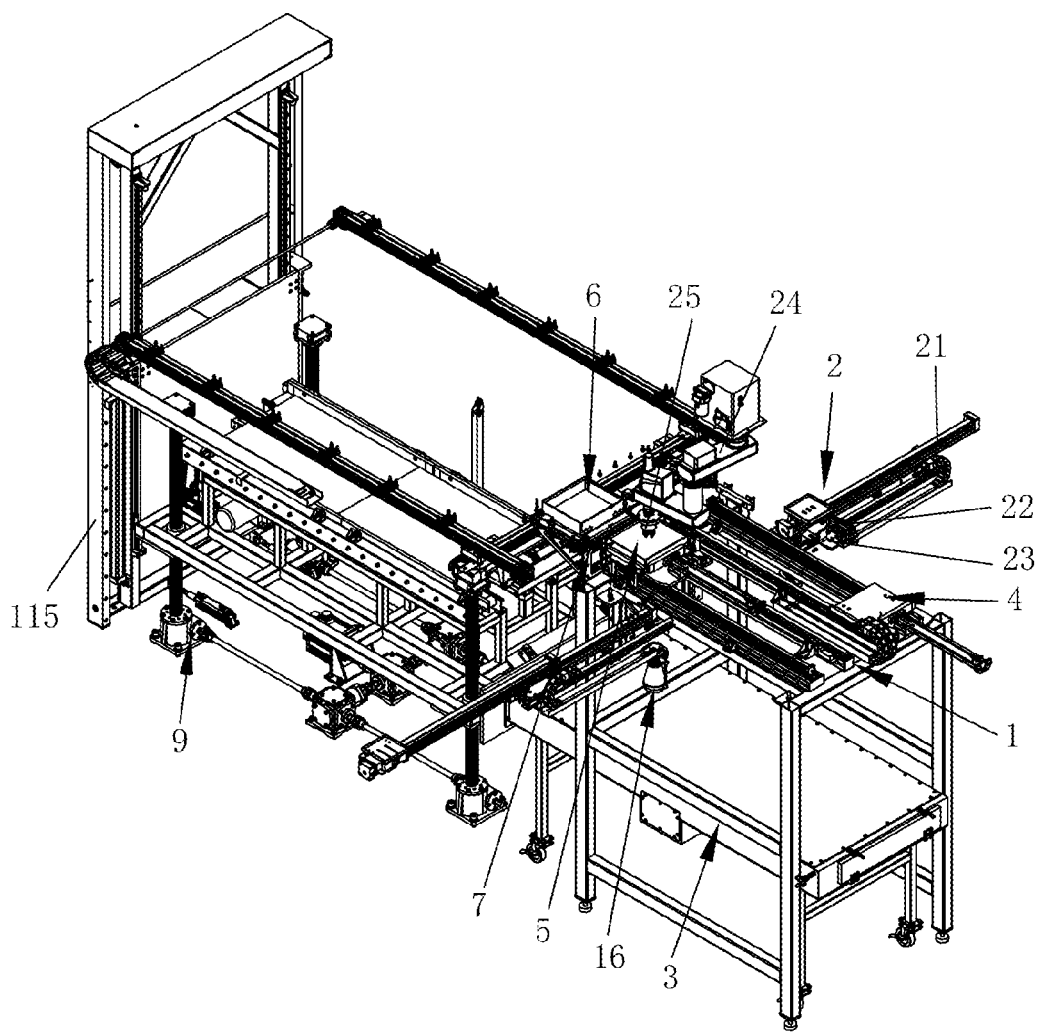
FIG. 1 shows a schematic structural diagram of the present invention.

In the drawings, reference signs are as follows: 1, cassette conveying mechanism; 2, product conveying and flipping mechanism; 3, pallet feeding mechanism; 4, blank disc receiving station; 5, product feeding station; 6, product disc stacking station; 7, cassette positioning mechanism; 8, cassette lifting and partitioning mechanism; 9, screw rod lifting mechanism; 10, palletizing and conveying mechanism; 11, gantry truss transplanting mechanism; 12, conveying rack; 13, graphite cassette fixing seat; 14, fore-and-aft movement cylinder; 15, graphite cassette pushing cylinder; 16, waste collector; 21, product transporting cylinder; 22, flipping cylinder; 23, flipping plate, 24, multi-joint robotic arm; 25, robotic arm quick-change chuck; 81, lifting and feeding port; 82, cassette lifting guide rail; 83, cassette lifting cylinder; 84, cassette lifting and partitioning seat; 91, lifting motor; 92, vertical screw rod; 101, conveying line framework; 102, conveying line; 111, horizontal linear module of graphite cassette grabbing mechanism; 112, longitudinal linear module of graphite cassette grabbing mechanism; 113, graphite cassette grabbing and lifting cylinder; 114, dual-purpose clamping mechanism for cassette picking and capping; and 115, unloading door opening/closing and compressing mechanism.

DETAILED DESCRIPTION OF THE INVENTION

The present invention will be further explained below in conjunction with the accompanying drawings.

As shown in FIG. 1 to FIG. 5, a stacking and palletizing device includes a cassette conveying mechanism 1. A middle portion of the cassette conveying mechanism 1 is provided with a product transporting and flipping mechanism 2 at a side; a rear end of the cassette conveying mechanism 1 is provided with a product disc stacking mechanism capable of performing disc stacking on finished products; and a pallet feeding mechanism 3 is disposed below the cassette conveying mechanism 1. The cassette conveying mechanism 1 is provided thereon with an blank disc receiving station 4, a product loading station 5 and a product disc stacking station 6; the product transporting and flipping mechanism 2 is disposed outside of the product loading station 5, which is correspondingly provided with a cassette positioning mechanism 7; a cassette lifting and partitioning mechanism 8 is disposed below the product disc stacking station 6; the product disc stacking mechanism includes a screw rod lifting mechanism 9, which is provided thereon with a palletizing and conveying mechanism 10; and a gantry truss transplanting mechanism 11 is correspondingly disposed above the screw rod lifting mechanism 9. During loading and disc stacking, blank discs are pushed to the blank disc receiving station 4, conveyed to the product loading station 5 by the cassette conveying mechanism 1 and positioned by the cassette positioning mechanism 7; products are conveyed and flipped by the product transporting and flipping mechanism 2 and then installed in the blank discs; meanwhile, the pallet feeding mechanism 3 conveys pallets onto the product disc stacking mechanism; then, the cassette conveying mechanism 1 conveys loaded graphite cassettes to the disc stacking station; the products loaded into the graphite cassettes are lowered to an appropriate position by means of the cassette lifting and partitioning mechanism 8; the screw rod lifting mechanism 9 drives the palletizing and conveying mechanism 10 to move the pallets fed by the pallet feeding mechanism 3 onto the palletizing and conveying mechanism 10; and finally, the gantry truss transplanting mechanism 11 piles up the products on the cassette lifting and partitioning mechanism 8 into the pallets for lifting and palletizing operations. The cassette conveying mechanism 1, the product transporting and flipping mechanism 2, and the pallet feeding mechanism 3 are closely and consecutively coordinated in linkage with the product disc stacking mechanism, and the screw rod lifting mechanism 9, the palletizing and conveying mechanism 10, the gantry truss transplanting mechanism 11, and the cassette lifting and partitioning mechanism 8 are coordinated by automatic lifting to pile up the graphite cassettes with products loaded, layer by layer, such that the overall palletizing operation is simple and smooth, which improves the quality and efficiency of product palletizing.

As shown in FIG. 1, in this embodiment, the cassette conveying mechanism 1 includes a conveying rack 12, an upper end of which is provided with two sets of movement guide rail; each set of the movement guide rail is provided with a matching graphite cassette fixing seat 13 and a fore-and-aft movement cylinder 14 for pushing the graphite cassette fixing seat 13 to move; and a rear end of each graphite cassette fixing seat 13 is provided with a graphite cassette pushing cylinder 15. After the blank disc feeding mechanism feeds the empty graphite cassettes to the graphite cassette fixing seat 13, the empty graphite cassettes are pushed to the product loading station 5 by means of the fore-and-aft movement cylinder 14.

Figure 2:
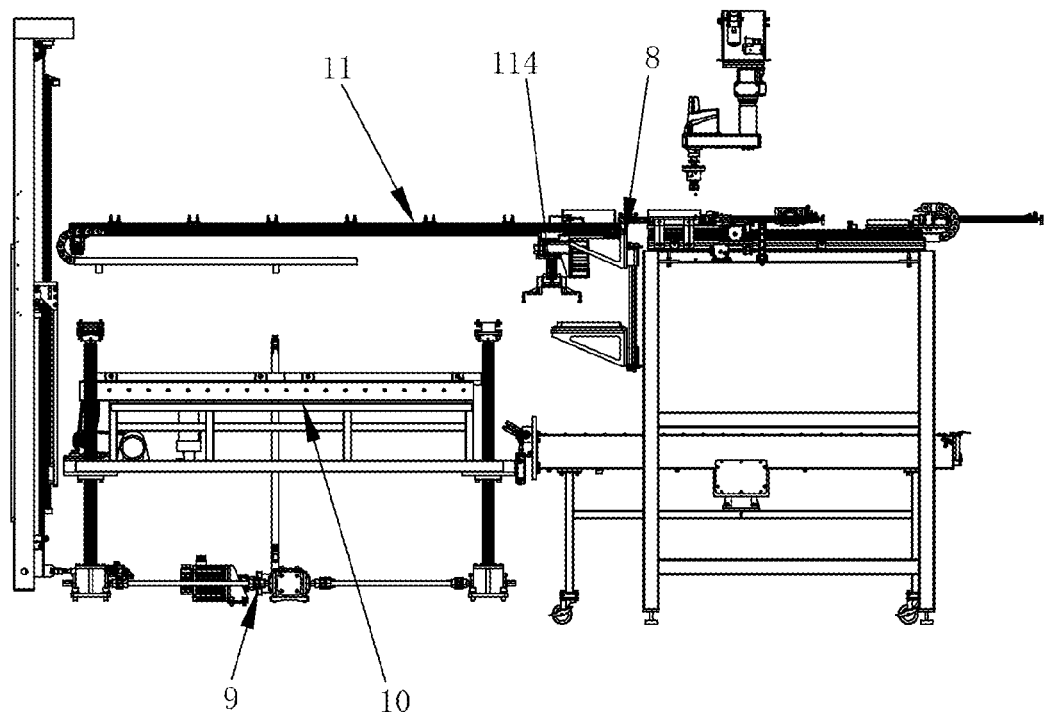
FIG. 2 shows a sectional view of the present invention.
Figure 3:
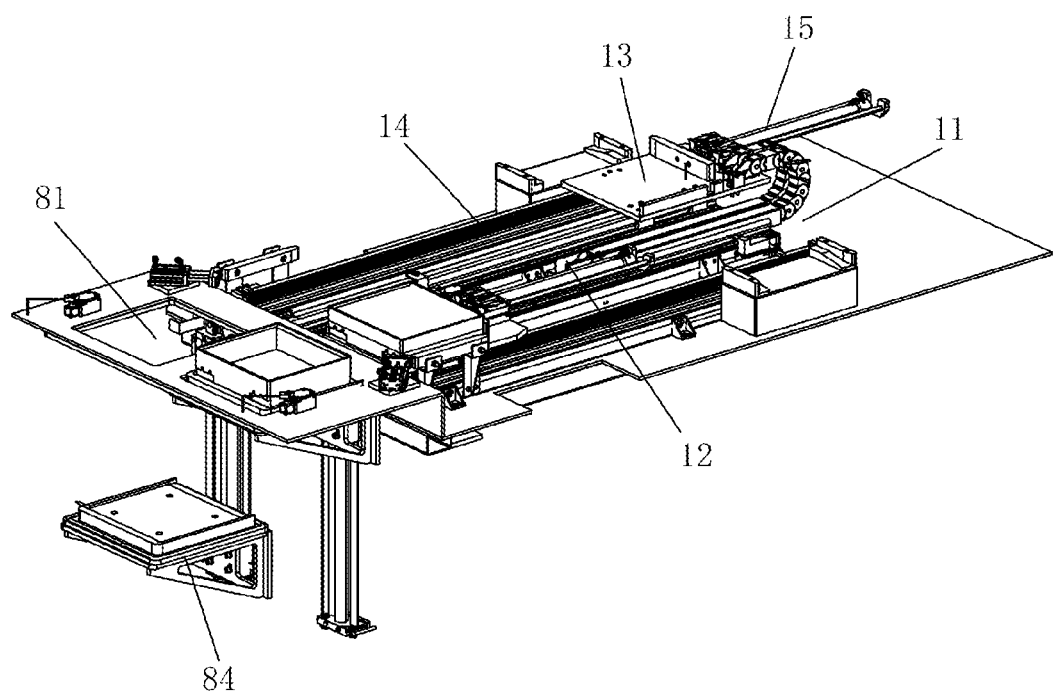
FIG. 3 shows a schematic structural diagram of a cassette conveying mechanism according to the present invention.

As shown in FIG. 1 to FIG. 3, in this embodiment, the product transporting and flipping mechanism 2 includes a product transporting frame that is provided with a product transporting cylinder 21; an output end of the product transporting cylinder 21 is connected to a product transporting tray; the product transporting frame is connected to a flipping cylinder 22 by means of a drag chain; an output end of the flipping cylinder 22 is connected to a flipping plate 23; a multi-joint robotic arm 24 is disposed above the product loading station 5; and an output end of the multi-joint robotic arm 24 is connected to a robotic arm quick-change chuck 25 for grabbing and flipping the products on the product transporting and flipping mechanism 2 and then grabbing and installing the products in the graphite cassettes. After the blank discs (graphite cassettes) are pushed to the product loading station 5 by means of the fore-and-aft movement cylinder 14, the blank discs are positioned by means of the cassette positioning mechanism 7; the product transporting cylinder 21 pushes products to the tail end of the product transporting frame; the multi-joint robotic arm 24 then controls the robotic-arm quick-change chuck 25 to tightly grab the products and deliver the products to the flipping plate 23; the flipping cylinder 22 drives the flipping plate and the products for flipping; again, the multi-joint robotic arm 24 controls the robotic-arm quick-change chuck 25 to grab the flipped products and deliver the products into the graphite cassettes for loading; and after the loading of products is completed, the graphite cassettes are delivered onto the cassette lifting and partitioning mechanism 8 by means of the graphite cassette pushing cylinder 15.

Figure 4:
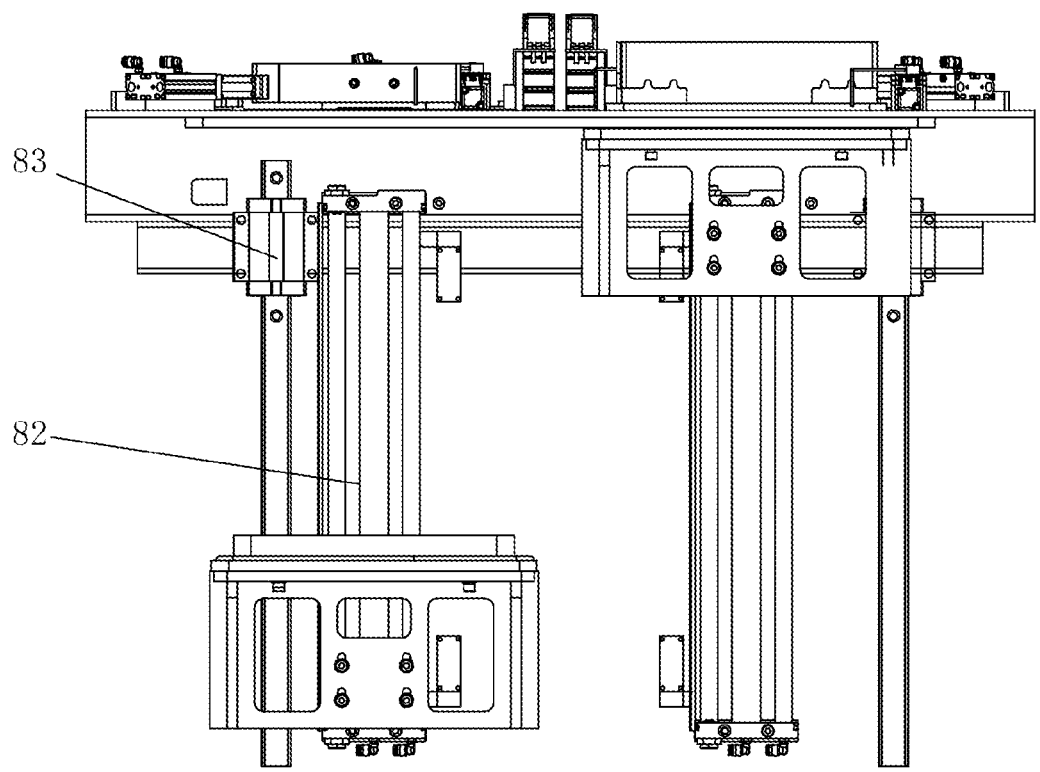
FIG. 4 shows a side view of a cassette conveying mechanism according to the present invention.

As shown in FIG. 2 to FIG. 4, in this embodiment, the cassette lifting and partitioning mechanism 8 includes a lifting and feeding port 81 provided at a rear end of the conveying rack 12; a cassette lifting guide rail 82 and a cassette lifting cylinder 83 are disposed below the lifting and feeding port 81 and are connected to a side surface of the conveying rack 12; and the cassette lifting guide rail 82 is provided with a cassette lifting and partitioning seat 84 connected to the cassette lifting cylinder 83. The graphite cassette pushing cylinder 15 delivers the loaded products to a position of the lifting and feeding port 81 and places the loaded products on the cassette lifting and partitioning seat 84. The cassette lifting cylinder 83 drives the cassette lifting and partitioning seat 84 and the products to descend to a position corresponding to the product disc stacking mechanism. In addition, only in case of delivery, the cassette lifting and partitioning seat 84 is moved to descend and the lifting and feeding port 81 is separated and opened, and for the rest of the time, the cassette lifting and partitioning seat 84 descends and the lifting and feeding port 81 is closed, such that oxygen intrusion can be prevented to avoid product oxidation. In addition, an oxygen bearing device and a nitrogen supply device are provided to provide protection against oxygen. The oxygen bearing device is configured to detect oxygen content, and when the oxygen content exceeds a standard value, the oxygen is exhausted and nitrogen is supplied. The detection, output, input and the like of oxygen and nitrogen pertain to the prior art, which will not be described in details here.

Figure 5:
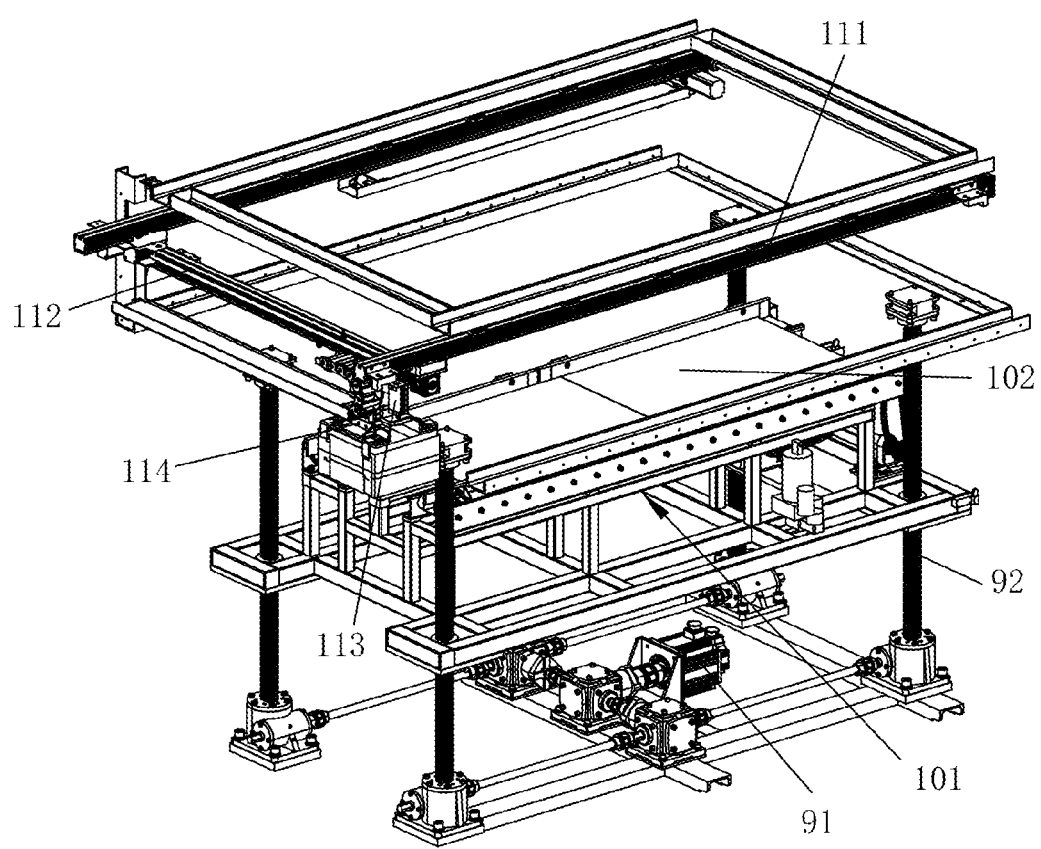
FIG. 5 shows a schematic structural diagram of a product disc stacking mechanism according to the present invention.

As shown in FIG. 5, in this embodiment, the screw rod lifting mechanism 9 includes a base, a middle portion of which is provided with a lifting motor 91; an output end of the lifting motor 91 is connected to a master transmission seat, both ends of which are each connected to a slave transmission seat; both ends of the slave transmission seat are each connected to a horizontal transmission rod, an output end of which is meshed and connected with a vertical screw rod 92; and the palletizing and conveying mechanism 10 is connected to middle portions of the vertical screw rods 92. The palletizing and conveying mechanism 10 includes a conveying line framework 101 connected to the vertical screw rods 92, and the conveying line framework 101 is provided with a conveying line 102 therein. The lifting motor 91 rotates forwardly and reversely to drive the master transmission seat, which then simultaneously drives the two slave transmission seats to rotate to allow rotation of the four vertical screw rods 92; the conveying line framework 101 and the conveying line 102 are controlled to perform lifting movement to first move to the position of the pallet feeding mechanism 3 to move the pallets to the conveying line 102, and then move to a position corresponding to the cassette lifting and partitioning seat 84; and loaded products are grabbed and placed onto the pallets by means of the gantry truss transplanting mechanism 11.

As shown in FIG. 5, in this embodiment, the gantry truss transplanting mechanism 11 includes horizontal linear modules 111 of a graphite cassette grabbing mechanism disposed above the vertical screw rods 92; lower ends of the horizontal linear modules 111 of the graphite cassette grabbing mechanism are provided with a matching longitudinal linear module 112 of the graphite cassette grabbing mechanism; a lower end of the longitudinal linear module 112 of the graphite cassette grabbing mechanism is connected, by means of a graphite cassette grabbing and lifting cylinder 113, to a dual-purpose clamping mechanism 114 for cassette picking and capping; a rear end of the conveying line framework 101 is connected with an unloading door, an inner side of which is correspondingly provided with an unloading door opening/closing and compressing mechanism 115. After movement to a position corresponding to the cassette lifting and partitioning seat 84, the horizontal linear modules 111 of the graphite cassette grabbing mechanism, the longitudinal linear module 112 of the graphite cassette grabbing mechanism, and the graphite cassette grabbing and lifting cylinder 113 are coordinated in linkage, such that the dual-purpose clamping mechanism 114 for cassette picking and capping clamps the graphite cassettes with products loaded and delivers them to the pallets on the conveying line 102. After a layer of graphite cassettes with products loaded is placed on the pallets, the horizontal linear modules 111 of the graphite cassette grabbing mechanism, the longitudinal linear module 112 of the graphite cassette grabbing mechanism, and the graphite cassette grabbing and lifting cylinder 113 are coordinated to move down the dual-purpose clamping mechanism 114 for cassette picking and capping by a distance of one layer of the graphite cassettes, to subsequently carry out stacking for the next layer. In such a way, multi-layer disc stacking is implemented. Finally, by means of the conveying line 102, the products subjected to disc stacking are delivered out by a transit wagon via the unloading door.

In this embodiment, the other end of the drag chain is connected to a waste collector 16, the upper portion of which is provided with an openable collection port, and the waste collector 16 may control the opening/closing of the openable collection port to collect and dispose wastes produced during conveying of the blank discs and products.

Described above only provides preferred embodiments of the present invention. Therefore, any equivalent variations or modifications made to the construction, features and principle within the scope of patent application of the present invention shall be included within the scope of patent application of the present invention.

What is claimed is:

1. A stacking and palletizing device, comprising a cassette conveying mechanism (1), wherein a middle portion of the cassette conveying mechanism (1) is provided with a product transporting and flipping mechanism (2) at a side, a rear end of the cassette conveying mechanism (1) is provided with a product disc stacking mechanism capable of performing disc stacking on finished products, and a pallet feeding conveyor (3) is disposed below the cassette conveying mechanism (1), wherein the cassette conveying mechanism (1) is provided thereon with an blank disc receiving station (4), a product loading station (5) and a product disc stacking station (6); wherein the product transporting and flipping mechanism (2) is disposed outside of the product loading station (5), which is correspondingly provided with a cassette positioning stop plate (7); wherein a cassette lifting and partitioning mechanism (8) is disposed below the product disc stacking station (6); wherein the product disc stacking mechanism comprises a screw rod lifting mechanism (9), which is provided thereon with a palletizing and conveying mechanism (10); wherein a gantry truss transplanting mechanism (11) is correspondingly disposed above the screw rod lifting mechanism (9); wherein during loading and disc stacking, blank discs are pushed to the blank disc receiving station (4), conveyed to the product loading station (5) by the cassette conveying mechanism (1) and positioned by the cassette positioning stop plate (7), products are conveyed and flipped by the product transporting and flipping mechanism (2) and then installed in the blank discs, meanwhile, the pallet feeding conveyor (3) conveys pallets onto the product disc stacking mechanism, then, the cassette conveying mechanism (1) conveys loaded graphite cassettes to the disc stacking station (6), the products loaded into the graphite cassettes are lowered to an appropriate position by means of the cassette lifting and partitioning mechanism (8), the screw rod lifting mechanism (9) drives the palletizing and conveying mechanism (10) to move the pallets fed by the pallet feeding conveyor (3) onto the palletizing and conveying mechanism (10), and finally, the gantry truss transplanting mechanism (11) piles up the products on the cassette lifting and partitioning mechanism (8) into the pallets for lifting and palletizing operations.

2. The stacking and palletizing device according to claim 1, wherein the cassette conveying mechanism (1) further comprises a conveying rack (12), an upper end of which is provided with two sets of movement guide rail; each set of the movement guide rail is provided with a matching graphite cassette fixing seat (13) and a fore-and-aft movement cylinder (14) for pushing the graphite cassette fixing seat (13) to move; and wherein a rear end of each graphite cassette fixing seat (13) is provided with a graphite cassette pushing cylinder (15).

3. The stacking and palletizing device according to claim 2, wherein the product transporting and flipping mechanism (2) further comprises a product transporting frame that is provided with a product transporting cylinder (21); wherein an output end of the product transporting cylinder (21) is connected to a product transporting tray; wherein the product transporting frame is connected to a flipping cylinder (22) by means of a drag chain; an output end of the flipping cylinder (22) is connected to a flipping plate (23); wherein a multi-joint robotic arm (24) is disposed above the product loading station (5); and wherein an output end of the multi-joint robotic arm (24) is connected to a robotic arm quick-change chuck (25) for grabbing and flipping the products on the product transporting and flipping mechanism (2) and then grabbing and installing the products into the graphite cassettes.

4. The stacking and palletizing device according to claim 2, wherein the cassette lifting and partitioning mechanism (8) further comprises a lifting and feeding port (81) provided at a rear end of the conveying rack (12); wherein a cassette lifting guide rail (82) and a cassette lifting cylinder (83) are disposed below the lifting and feeding port (81) and are connected to a side surface of the conveying rack (12); and the cassette lifting guide rail (82) is provided with a cassette lifting and partitioning seat (84) connected to the cassette lifting cylinder (83).

5. The stacking and palletizing device according to claim 2, wherein the screw rod lifting mechanism (9) further comprises a base, a middle portion of which is provided with a lifting motor (91); wherein an output end of the lifting motor (91) is connected to a master transmission seat, both ends of which are each connected to a slave transmission seat; both ends of the slave transmission seat are each connected to a horizontal transmission rod, an output end of which is meshed and connected with a vertical screw rod (92); and wherein the palletizing and conveying mechanism (10) is connected to middle portions of the vertical screw rods (92).

6. The stacking and palletizing device according to claim 5, wherein the palletizing and conveying mechanism (10) further comprises a conveying line framework (101) connected to the vertical screw rods (92), and the conveying line framework (101) is internally provided with a conveying line (102).

7. The stacking and palletizing device according to claim 5, wherein the gantry truss transplanting mechanism (11) further comprises horizontal linear modules (111) of a graphite cassette grabbing mechanism disposed above the vertical screw rods (92); wherein lower ends of the horizontal linear modules (111) of the graphite cassette grabbing mechanism are provided with a matching longitudinal linear module (112) of the graphite cassette grabbing mechanism; a lower end of the longitudinal linear module (112) of the graphite cassette grabbing mechanism is connected, by means of a graphite cassette grabbing and lifting cylinder (113), to a dual-purpose clamping mechanism (114) for cassette picking and capping; a rear end of the conveying line framework (101) is connected with an unloading door, an inner side of which is correspondingly provided with an unloading door opening/closing and compressing mechanism (115).

8. The stacking and palletizing device according to claim 3, wherein the other end of the drain chain is connected to a waste collector (16), an upper portion of which is provided with an openable collection port.

* * * * *